(12) United States Patent
Meruva et al.

(10) Patent No.: US 10,310,463 B2
(45) Date of Patent: Jun. 4, 2019

(54) BUILDING SYSTEM CONTROLLER CONFIGURATION PROPAGATION

(71) Applicant: Honeywell International Inc., Morris Plains, NJ (US)

(72) Inventors: Jayaprakash Meruva, Bangalore (IN); Manish Gupta, Bangalore (IN); Andrew David Halford, Manchester, MD (US); Cary Leen, Hammond, WI (US); Nagasree Poluri, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 277 days.

(21) Appl. No.: 15/164,428

(22) Filed: May 25, 2016

(65) Prior Publication Data

US 2017/0343970 A1 Nov. 30, 2017

(51) Int. Cl.
*G05B 15/02* (2006.01)
*H04L 12/28* (2006.01)
*H04L 12/24* (2006.01)
*H04L 29/08* (2006.01)

(52) U.S. Cl.
CPC .......... *G05B 15/02* (2013.01); *H04L 12/2816* (2013.01); *H04L 67/10* (2013.01); *H04L 67/12* (2013.01); *H04L 67/125* (2013.01); *G05B 2219/2642* (2013.01)

(58) Field of Classification Search
CPC . G05B 15/02; H04L 12/2816; H04L 41/0879; H04L 67/125; H04L 41/0863
See application file for complete search history.

(56) References Cited

U.S. PATENT DOCUMENTS

| 2001/0056304 | A1* | 12/2001 | Nitta | G05B 19/0428 700/21 |
| 2004/0204793 | A1* | 10/2004 | Yoon | G05D 23/1905 700/277 |
| 2004/0255601 | A1* | 12/2004 | Kwon | H04L 12/2823 62/157 |
| 2005/0209739 | A1* | 9/2005 | Kwon | G05B 19/042 700/277 |
| 2007/0038832 | A1* | 2/2007 | Wu | G06F 11/2028 711/167 |

(Continued)

*Primary Examiner* — Charles R Kasenge
(74) *Attorney, Agent, or Firm* — Seager, Tufte & Wickhem LLP

(57) ABSTRACT

Systems, devices, and methods for building system controller configuration propagation are described herein. One system includes a first plant controller configured to control a plurality of controllers of a building system on a first channel, wherein one of the plurality of controllers on the first channel is a master controller, and a subset of the plurality of controllers on the first channel are follower controllers of the master controller, a second plant controller configured to control a plurality of controllers of the building system on a second channel, wherein a subset of the plurality of controllers on the second channel are follower controllers of the master controller, and a computing device in communication with the first plant controller and the second plant controller and configured to receive an indication of a parameter modification made to the master controller and communicate the parameter modification to the second plant controller.

16 Claims, 3 Drawing Sheets

(56) References Cited

U.S. PATENT DOCUMENTS

| | | | | |
|---|---|---|---|---|
| 2008/0142607 | A1* | 6/2008 | Yoshii | F24F 11/30 236/51 |
| 2011/0119453 | A1* | 5/2011 | Xu | G06F 12/084 711/148 |
| 2013/0085613 | A1* | 4/2013 | Bester | F24F 11/0001 700/277 |
| 2013/0218349 | A1* | 8/2013 | Coogan | G05B 13/02 700/275 |
| 2014/0232372 | A1* | 8/2014 | Heintz | H02J 3/14 324/76.47 |
| 2014/0359106 | A1* | 12/2014 | Ochiai | H04L 43/04 709/223 |
| 2014/0379138 | A1* | 12/2014 | Keenan, Jr. | G05B 15/02 700/275 |
| 2015/0142176 | A1* | 5/2015 | Senba | G05B 15/02 700/275 |
| 2015/0219354 | A1* | 8/2015 | Isono | F24F 11/30 165/208 |

* cited by examiner

BUILDING SYSTEM CONTROLLER CONFIGURATION PROPAGATION

TECHNICAL FIELD

The present disclosure relates to systems and devices for building system controller configuration propagation.

BACKGROUND

One or more building systems can be installed in a building to allow for the management of aspects of the building. Building systems can include, for example, heating, ventilation, and air conditioning (HVAC) systems, access control systems, security systems, lighting systems, and fire systems, among others. A building system can refer to a single building system (e.g., an HVAC system) and/or a system that manages a number of building systems (e.g., a building management system (BMS)).

Each building system typically includes a plurality of devices. When a building system is commissioned (e.g., at installation), controllers of the building system may be configured. Configuring a controller may involve setting parameters such as proportional-integral-derivative controller (PID) parameters, setpoint values, calibrated offset values, input/output (I/O) types, etc.

However, some parameters may change during the commissioning process. Such changes may be due to an error during engineering phases and/or changes in specifications, among other reasons. These changes may need to be implemented across a multitude of controllers of a building system before commissioning can be completed.

Previous approaches to dealing with controller parameter changes may involve a commissioning engineer using an online tool to make changes in a single controller, testing the controller, and then repeating the usage of the tool in the other controllers. These approaches may be time-consuming and/or repetitive. For instance, even for comparatively minor changes, such as setpoint and/or offset adjustments, the commissioning engineer may devote several weeks of time to make a manual configuration change to all of the controllers.

DETAILED DESCRIPTION

Figure 1:
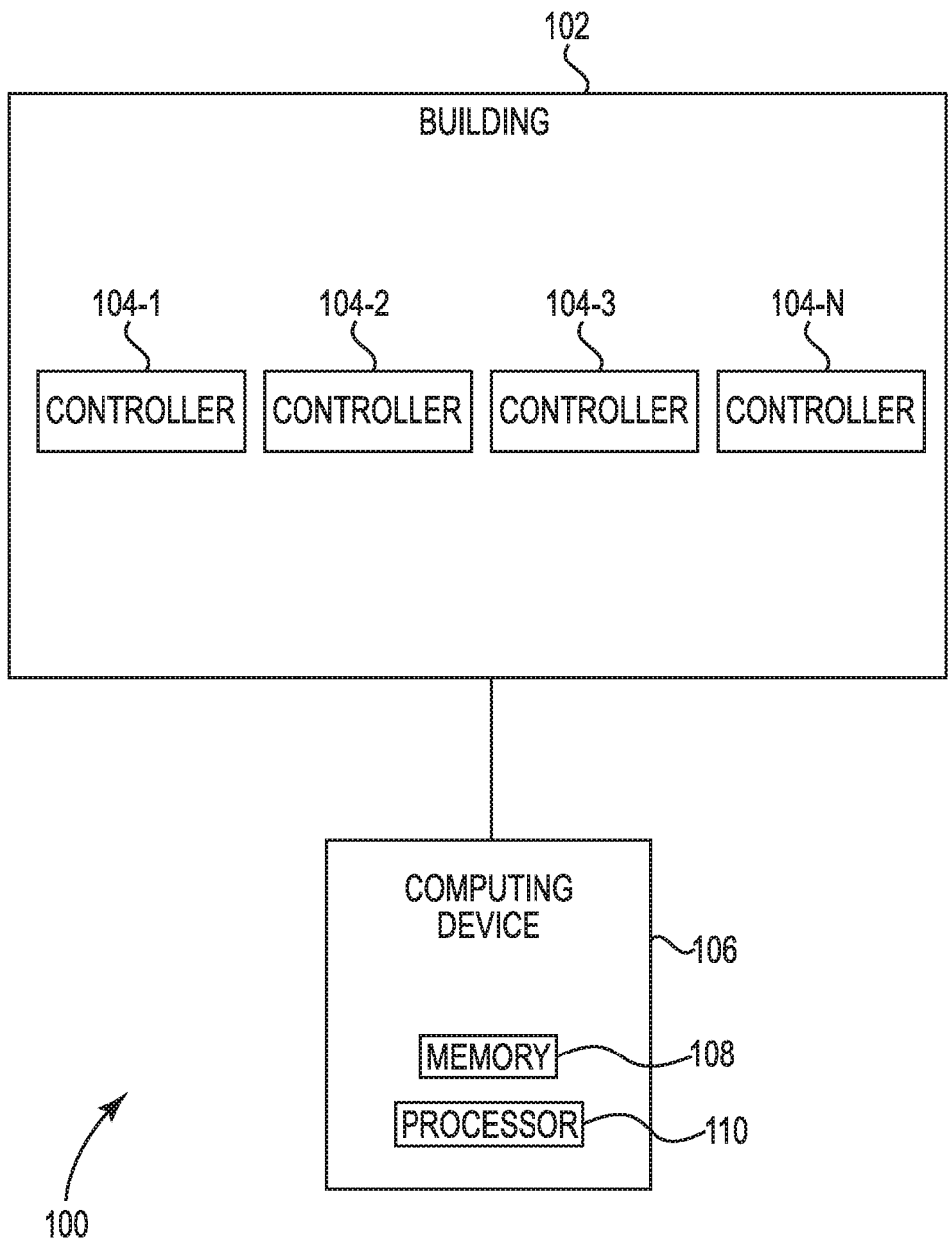
FIG. 1 illustrates a system for building system controller configuration propagation in accordance with one or more embodiments of the present disclosure.

Building system controller configuration is described herein. For example, one or more embodiments include a first plant controller configured to control a plurality of controllers of a building system on a first channel, wherein one of the plurality of controllers on the first channel is a master controller, and a subset of the plurality of controllers on the first channel are follower controllers of the master controller, a second plant controller configured to control a plurality of controllers of the building system on a second channel, wherein a subset of the plurality of controllers on the second channel are follower controllers of the master controller on the first channel, and a computing device in communication with the first plant controller and the second plant controller and configured to receive an indication of a parameter modification made to the master controller on the first channel, and communicate the parameter modification to the second plant controller, wherein the second plant controller is configured to propagate the parameter modification to the subset of the plurality of controllers on the second channel that are follower controllers of the master controller of the first channel.

Embodiments of the present disclosure can streamline building system controller configuration by automating commonly repeated tasks and reducing the complexity involved in controller commissioning. In some embodiments, changes made to one controller can be effectuated in other, similar controllers automatically (e.g., without user input). This "cascading" can result in a change to one controller being made automatically to all similar controllers of the building system. According to some embodiments, when an error (e.g., a configuration error) is corrected in controller, the correction propagates to each similar controller.

During a commissioning process, some parameters may change due to an error during engineering phases and/or specification changes (e.g., customer-desired operational changes), among other reasons. For example, a building may plan for one type of sensor to be installed therein, but, due to an unavailability of those sensors (e.g., those model numbers) at installation, a different type of sensor may be selected instead. However, by the time the selection of the new sensor type was made, a programmer may have engineered the controller(s) with the old sensor type and created binaries for a commissioning engineer to perform commissioning activities based on the old sensor type.

In another example, after the commissioning of variable air volume (VAV) controllers, a customer may request to change the application configuration by placing a cap on a maximum reachable setpoint value. These changes may need to be implemented across a multitude of controllers of a building system before commissioning can be completed.

Previous approaches to dealing with such controller parameter changes may involve a commissioning engineer using an online tool to make changes in a single controller, testing the controller, and then repeating the usage of the tool in the other controllers. These approaches may be time-consuming and/or repetitive. For instance, even for comparatively minor changes, such as setpoint and/or offset adjustments, the commissioning engineer may devote several weeks of time to make a manual configuration change to all of the controllers.

In another example, for instance, an error may be found in the control logic of one of several hundred controllers that have already been programmed. Previous approaches may involve manually correcting the same configuration in each of the several hundred controllers. In contrast, embodiments of the present disclosure can propagate such changes automatically after one controller has been modified. Embodiments of the present disclosure can result in time savings during commissioning that translate to a measurable reduction in monetary investment.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. As used herein, "a" or "a number of" something can refer to one or more such things. For example, "a number of controllers" can refer to one or more controllers.

FIG. 1 illustrates a system 100 for building system controller configuration in accordance with one or more embodiments of the present disclosure. As shown in FIG. 1, system 100 includes a building 102. The building 102 can refer to one or more structures, businesses, homes, plants, facilities, hospitals, refineries, etc.

As shown in FIG. 1, the building 102 includes a plurality of controllers; a controller 104-1, a controller 104-2, a controller 104-3, and a controller 104-N (sometimes cumulatively referred to herein as "controllers 104"). Each of the controllers 104 can be a device configured to control operations of one or more building system devices. In some embodiments, each of the controllers 104 can be a part of a building system device. The controllers 104 can be building management system (BMS) controllers.

The controllers 104 can be associated with (e.g., control) devices of a building system. A building system can be an HVAC system, an access control system, a security system, a lighting system, and a fire system, among other systems. The devices can be devices of one or more building systems. For example, one or more of the devices can be, but are not limited to, an air handling unit, a controller, a thermostat, a VAV device, a security camera, an access control device, a sensor, and an alarm. The devices are devices that are managed by one or more of the controllers 104 and can participate in a network (e.g., a connected building system) of other devices.

The devices can be wired and/or wirelessly connected to the controllers 104 such that the devices and the controllers 104 can communicate information with one another. In some embodiments, each of the controllers 104 may be associated with a single device, such as in the example discussed in connection with FIG. 2. In such instances, "device" and "controller" may be used interchangeably to refer individually to one of the controllers 104, though embodiments of the present disclosure are not so limited.

In some embodiments, a number of the controllers 104 can be unitary controllers. A unitary controller, as referred to herein, is a device for digital control of packaged air handling units (AHUs), variable air volume (VAV) devices, unit ventilators, fan coils, heat pumps, and other terminal heating, ventilation, and air conditioning (HVAC) units serving a single portion (e.g., zone and/or room) of the building 102. Unitary controllers may use the Public Unitary Protocol, for instance.

As shown in FIG. 1, the system 100 can include a computing device 106. Though in the example illustrated in FIG. 1 the computing device 106 is shown external to the building 102 (e.g., remote with respect to the building 102), embodiments of the present disclosure are not so limited. In some embodiments, the computing device 106 is internal to the building 102 (e.g., local with respect to the building 102). In some embodiments, the computing device 106 can be a remote server (e.g., a cloud-hosted service). In some embodiments, the computing device 106 can be a mobile device. In some embodiments, the computing device 106 can be a local control panel and/or operator station.

The computing device 106 can include a memory 108 and a processor 110 configured to execute executable instructions stored in the memory 108 to perform various examples of the present disclosure, for example. That is, the memory 108 can be any type of non-transitory storage medium that can be accessed by the processor 110 to perform various examples of the present disclosure. For example, the memory 108 can be a non-transitory computer readable medium having computer readable instructions (e.g., computer program instructions) stored thereon that are executable by the processor 110.

The memory 108 can be volatile or nonvolatile memory. The memory 108 can also be removable (e.g., portable) memory, or non-removable (e.g., internal) memory. For example, the memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although the memory 108 is illustrated as being located within the computing device 106, embodiments of the present disclosure are not so limited. For example, the memory 108 can also be located internal to another computing resource (e.g., enabling computer readable instructions to be downloaded over the Internet or another wired or wireless connection).

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

As previously discussed, the computing device 106 can be a mobile device, in some embodiments. The mobile device can be a client device carried or worn by a user. For example, the mobile device can be a phone (e.g., smartphone), personal digital assistant (PDA), tablet, and/or wearable device (e.g., wristband, watch, necklace, etc.). The mobile device can include one or more software applications (e.g., apps) which can define and/or control communications between the mobile device and the controllers 104. Apps may be received by the mobile device from one or more other computing devices. Apps may be launched by a user and/or responsive to some other condition. In some embodiments, apps can be executing as background apps.

Figure 2:
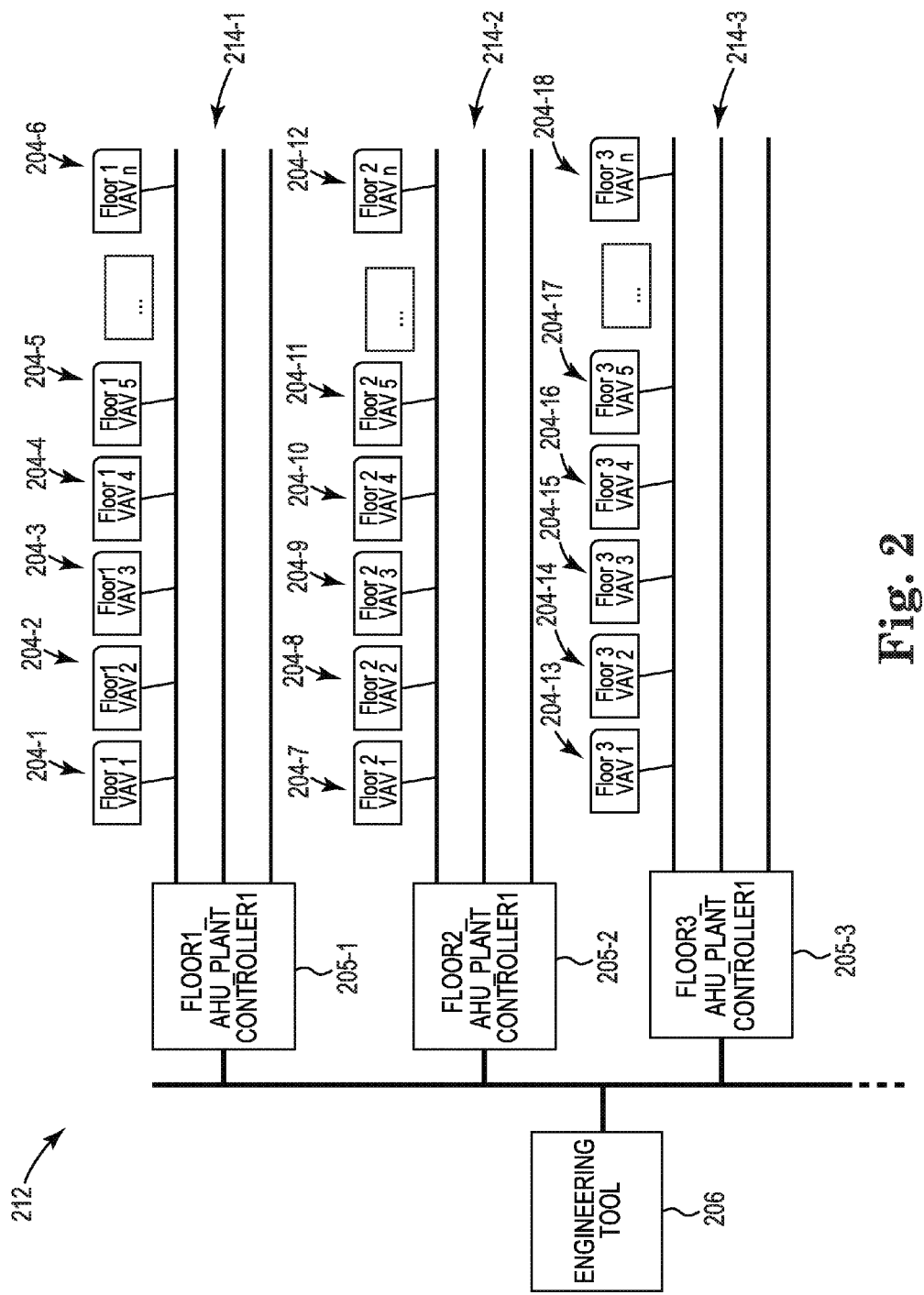
FIG. 2 illustrates a system for building system controller configuration propagation in accordance with one or more embodiments of the present disclosure.

FIG. 2 illustrates a system 212 for building system controller configuration in accordance with one or more embodiments of the present disclosure. The system 212 can be implemented in a building (not shown in FIG. 2) in a manner analogous to that illustrated in FIG. 1, for instance, and can include a computing device 206, which can be local with respect to the building (e.g., within the building and/or connected to devices of the building by a wired and/or wireless network) and/or remote with respect to the building (e.g., accessible via the internet). The computing device can be in communication with a plurality of controllers.

As shown in FIG. 2, the system 212 can include a plurality of controllers (sometimes cumulatively referred to as "controllers 204"). The plurality of controllers 204 can be unitary controllers. In some embodiments, such as the example illustrated in FIG. 2, for instance, the controllers 204 can be VAV controllers (e.g., controllers associated with VAV devices). For instance, the system 212 can include a controller 204-1, a controller 204-2, a controller 204-3, a controller 204-4, a controller 204-5, a controller 204-6, a controller 204-7, a controller 204-8, a controller 204-9, a controller 204-10, a controller 204-11, a controller 204-12, a controller 204-13, a controller 204-14, a controller 204-15, a controller 204-16, a controller 204-17, and a controller 204-18. Each of the controllers 204 can control a number of aspects of a respective portion of the building.

The controllers 204 can be on a particular channel. For instance, the controllers 204-1, 204-2, 204-3, 204-4, 204-5, and 204-6 (referred to herein as "first channel controllers") are on a first channel 214-1. The controllers 204-7, 204-8, 204-9, 204-10, 204-11, and 204-12 (referred to herein as "second channel controllers") are on a second channel 214-2. The controllers 204-13, 204-14, 204-15, 204-16, 204-17, and 204-18 (referred to herein as "third channel controllers") are on a third channel 214-3. In the example system 212, the channels 214, 214-2, and 214-3 refer to different floors of the building, though, as previously noted, embodiments of the present disclosure are not so limited.

The controllers on the first channel 214-1 can be controlled by a first plant controller 205-1. The controllers on the second channel 214-2 can be controlled by a second plant controller 205-2. The controllers on the third channel 214-3 can be controlled by a third plant controller 205-3. A plant controller, as referred to herein, is a device for digital control of one or more portions of one or more building systems. A plant controller may include more monitoring and/or control points than a unitary controller, for instance. A plant controller may manage (e.g., control) operations of one or more unitary controllers. A plant controller may be associated with (e.g., control) a channel of a building system. A channel, as referred to herein, includes a particular subset of a building system. For example, a channel can refer to a floor, a room, an area, and/or a region of a building. A channel can include a number of unitary controllers.

It is noted that the controllers 204 illustrated in FIG. 2 refer to controllers of a same or similar type. Embodiments of the present disclosure can propagate parameter changes made to a single controller throughout similar controllers of the system 212. In some embodiments, same or similar controllers can refer to controllers that perform a same function for which a desired change is to be effectuated. A controller that is a same or similar type to another controller can refer to an identical controller (e.g., same make, model, year, etc.). Same or similar controllers can refer to controllers that are similarly situated (e.g., located in similarly-sized zones and/or rooms).

In some embodiments, the computing device 206 can receive application binaries. The binaries can be files containing logical functions (e.g., logic) executable by the controllers 204. The binaries can define the operations of the controllers 204. Application binaries can be received from the controllers 204 and/or 206 themselves and/or from another source (e.g., a remote computing device). The binaries can include parameter modifications made to any of the controllers 204 (discussed below).

In some embodiments, the computing device 206 can receive controller hierarchy information. The hierarchy information defines and/or describes relationships (e.g., networks) between the unitary controllers 204 and/or the plant controllers 206. The hierarchy information can include master-follower controller hierarchy details. Hierarchy information can be received from the controllers 204 and/or 206 themselves and/or from another source (e.g., a remote computing device). In some embodiments, the hierarchy information can be configured during engineering time and stored remotely.

Once the binaries are received by the computing device 206, parameter changes (e.g., configuration changes) made to any of the controllers 204 can be tracked, monitored, or otherwise maintained by the computing device 206. Parameter changes to a particular controller can be made by the computing device 206 and/or manually, for instance, to correct an error and/or to reflect a change in specifications.

Once a parameter of one or more of the controllers 204 is modified, embodiments of the present disclosure can propagate the modification to other (e.g., all) controllers 204 in a number of manners. In some embodiments, for instance, the computing device 206 can cause (effectuate) the propagation. In some embodiments, one of the controllers 204 can cause the propagation. In some embodiments one of the plant controllers 206 can cause the propagation.

In an example, a parameter modification is made to the controller 204-1. Such a modification can be an adjustment of a setpoint of the building system (e.g., one or more devices of the building system) based on customer specifications, for instance. In some embodiments, the computing device 206 can receive an indication of the modification, communicate (e.g., download) the modification and/or hierarchy information (e.g., follower controller information) to a plant controller (e.g., plant controller 205-2). The plant controller can propagate the modification to its follower controllers (e.g., the controllers 204 that are on its channel) that are similar. In the example illustrated in FIG. 2, for instance, the similar controllers on the second channel 214-2 include the controllers 204-8, 204-9, 204-11, and 204-12.

For example, the modification can be communicated to the plant controller 205-2, which can cause the modification to occur on the second channel controllers. Similarly, the plant controller 205-3 can receive the modification and cause the modification to occur on the third channel controllers. The plant controller that received the modification can communicate a status (e.g., a report indicating successes and/or failures) of the propagation of the modification back to the computing device 206.

In some embodiments, the computing device 206 itself can execute the parameter modification in the controllers 204 sequentially (one after the other) based on the hierarchy information (e.g., master-follower relationships) and associated rules. In some embodiments, the sequential modification can be done without any user input (e.g., automatically). The computing device 206 can keep a record of the modifications, for instance.

In some embodiments, the modification can be communicated to a remote computing device (e.g., uploaded to the cloud) and can be propagated to the controllers 204 according to a schedule. Such embodiments may involve a live connection to the remote computing device (e.g., a live internet connection)

In some embodiments, the controller that was modified can be configured as (e.g., designated) a "master" controller. In the example discussed above, the controller 204-1 can be designated the master controller. Other controllers (e.g., the remainder of the controllers 204) can be configured as follower controllers of the master controller 204-1.

A set of rules can be defined for the master controller 204-1. The rules can be applied when the parameter modification made to the master controller 204-1 is to be propagated to the follower controllers. The rules can include, for instance, what information is to be copied and/or what information is to be excluded when the modification is being propagated. Master-follower information associated with the configuration of the controllers 204 as master(s) or follower(s) can be communicated to the computing device 206. The rules can be communicated to the computing device 206.

Accordingly, the master controller 204-1 can propagate the parameter modification to additional controllers on a same channel as the master controller 204-1. In the example shown in FIG. 2, for instance, the master controller 204-1 can propagate the parameter modification to similar controllers of the first channel. In some embodiments, similar controllers may refer to less than all controllers on a channel. In the example illustrated in FIG. 2, for instance, the similar controllers can include the controllers 204-2, 204-4, and 204-6.

There can be more than one master controller in accordance with embodiments of the present disclosure. In some embodiments, only one master may be allowed per follower. It is noted that master-follower relationships can be established, removed, and/or modified by the computing device 206.

In some embodiments, a modification of a parameter made to one controller can be propagated throughout the controllers 204 without an explicit trigger (e.g., a communication) from the computing device 206. In some embodiments, such propagation can occur without any communication between any of the controllers 204 and the computing device 206.

Embodiments of the present disclosure can include "undoing" a modification made to a controller and/or the propagation of that modification to any other of the controllers 204. Accordingly, embodiments herein can cause the controllers 204 to revert back to a previous configuration state (e.g., a state that existed before the parameter was modified and/or propagated). Such reversion can be done in response to a user input, in some embodiments.

Figure 3:
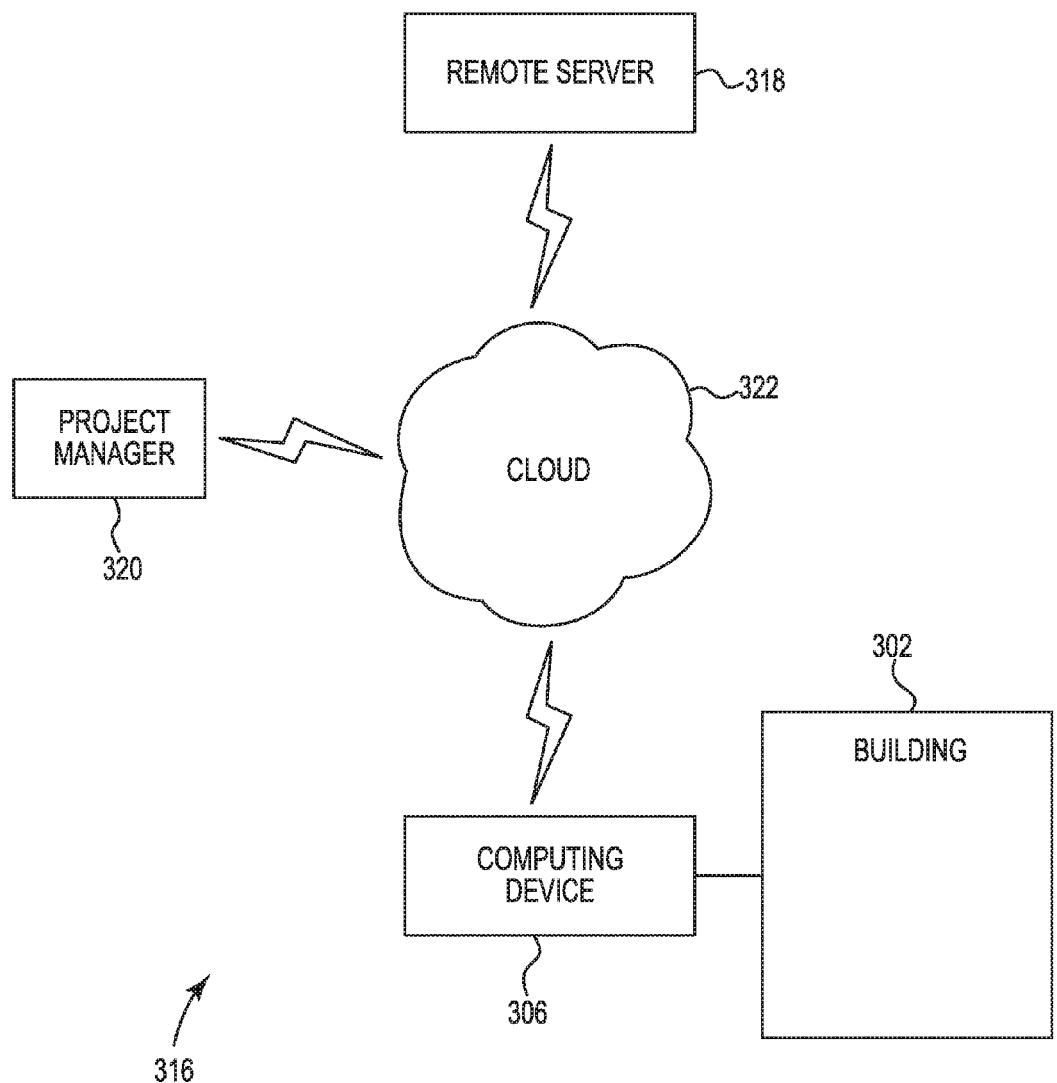
FIG. 3 illustrates a system for building system controller configuration propagation in accordance with one or more embodiments of the present disclosure.

FIG. 3 illustrates a system 316 for building system controller configuration in accordance with one or more embodiments of the present disclosure. System 316 includes a building 302, which can be analogous to the building 102, previously described in connection with FIG. 1. The building 302 can include a plurality of controllers such as those previously described in connection with FIGS. 1 and 2, for instance.

A local computing device 306, which may be analogous to the computing devices 106 and/or 206 respectively described in connection with FIGS. 1 and 2, can be in communication with the plurality of controllers of the building 302. As previously discussed, a remote server 318 can communicate with the computing device 306 and/or the controllers of the building 302 through an internet connection (illustrated in FIG. 3 as cloud 322). The cloud 322 refers to an internet-based computing system that provides shared processing resources and data to computers and other devices on demand. The cloud 322 can provide on-demand access to a shared pool of configurable computing resources (e.g., networks, servers, storage, applications and services), which can be provisioned and/or released.

The cloud 322 can also enable a user via an additional computing device (e.g., a mobile device) (entitled "project manager 320" in FIG. 3) to communicate with the computing device 302 and/or the plurality of controllers of the building 302. In some embodiments, the computing device 320 can be and/or provide a display dashboard. The dashboard can apprise a user (e.g., a project manager) of the status of controller configuration in accordance with the present disclosure. The dashboard can allow the management and/or control of controller configuration and/or configuration propagation.

The user of the computing device 320 may be local with respect to the building 302 (e.g., inside the building 302) or remote with respect to the building 302 (e.g., located away from the building 302). Thus, various embodiments described herein can be implemented using a computing device locally connected to controllers of the building 302 and/or remotely connected to controllers of the building 302.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for building system controller configuration propagation, comprising:
a first plant controller configured to control a plurality of controllers of a building system on a first channel, wherein:
one of the plurality of controllers on the first channel is a master controller; and a subset of the plurality of controllers on the first channel are follower controllers of the master controller;

a second plant controller configured to control a plurality of controllers of the building system on a second channel, wherein a subset of the plurality of controllers on the second channel are follower controllers of the master controller on the first channel; and a computing device in communication with the first plant controller and the second plant controller and configured to:

receive an indication of a parameter modification made to the master controller on the first channel; and communicate the parameter modification to the second plant controller; wherein the second plant controller is configured to propagate the parameter modification to the subset of the plurality of controllers on the second channel that are follower controllers of the master controller of the first channel.

2. The system of claim 1, wherein:

an additional subset of the plurality of controllers on the first channel are not follower controllers of the master controller; and an additional subset of the plurality of controllers on the second channel are not follower controllers of the master controller.

3. The system of claim 1, wherein each of the plurality of controllers on the first and second channels is configured to control a different variable air volume device.

4. The system of claim 1, wherein the parameter modification is an adjustment to a setpoint of the building system.

5. The system of claim 1, wherein each of the plurality of controllers on the first and second channels is a same controller type.

6. The system of claim 1, wherein the computing device is configured to receive the parameter modification during a commissioning of the plurality of controllers on the first and second channels.

7. The system of claim 1, wherein the parameter modification is made to the master controller to correct an error.

8. The system of claim 1, wherein the computing device is configured to receive the parameter modification from a user.

9. The system of claim 1, wherein the computing device is configured to communicate the parameter modification as logic to the second plant controller.

10. The system of claim 1, wherein the first channel is a first floor of a building having the building system installed therein, and wherein the second channel is a second floor of the building.

11. The system of claim 1, wherein the computing device is local with respect to the first plant controller, the plurality of controllers on the first channel, the second plant controller, and the plurality of controllers on the second channel.

12. The system of claim 1, wherein the computing device is remote with respect to the first plant controller, the plurality of controllers on the first channel, the second plant controller, and the plurality of controllers on the second channel.

13. A computing device for building system controller configuration propagation, comprising:

a processor; and a memory having instructions stored thereon which, when executed by the processor, cause the processor to:

determine a modification made to a parameter of a first unitary controller of a building system;

configure the first unitary controller as a master controller;

configure a second unitary controller of the building system as a follower controller, wherein the second unitary controller is a same controller type as the first unitary controller;

define a set of propagation rules associated with the master controller;

propagate the parameter modification to the follower controller according to the rules; and receive a status of the propagation of the parameter modification to the follower controlled according to the rules.

14. The computing device of claim 13, wherein the building system is a heating, ventilation, and air conditioning system of a building, and wherein the master controller and the follower controller control different portions of a same floor of the building.

15. The computing device of claim 13, wherein the memory includes instructions stored thereon which, when executed by the processor cause the processor to revert the master controller and the follower controller to a previous configuration state responsive to a user input.

16. The computing device of claim 13, wherein the memory includes instructions stored thereon which, when executed by the processor cause the processor to propagate the parameter modification to the follower controller via a remote server.

* * * * *